United States Patent [19]

Sugimoto

[11] Patent Number: 4,550,383
[45] Date of Patent: Oct. 29, 1985

[54] PARABOLIC POSITION AND ATTITUDE INTERPOLATION FOR A ROBOT HAND

[75] Inventor: Koichi Sugimoto, Hiratsuka, Japan

[73] Assignee: Hitachi, Ltd., Tokyo, Japan

[21] Appl. No.: 418,681

[22] Filed: Sep. 16, 1982

[30] Foreign Application Priority Data

Sep. 24, 1981 [JP] Japan ................................. 56-149393
Sep. 24, 1981 [JP] Japan ................................. 56-149394

[51] Int. Cl.$^4$ ............................................. G05B 19/42
[52] U.S. Cl. ..................................... 364/513; 364/169;
364/723; 901/3; 901/4; 318/573; 318/568
[58] Field of Search ............... 364/513, 169, 723, 853;
901/3, 4, 5; 318/573, 568

[56] References Cited

U.S. PATENT DOCUMENTS

| | | | |
|---|---|---|---|
| Re. 30,132 | 10/1979 | Irie ..................................... | 364/513 X |
| 3,860,805 | 1/1975 | Strukel ............................. | 364/723 X |
| 3,909,600 | 9/1975 | Hohn .................................. | 364/513 |
| 3,920,972 | 11/1975 | Corwin, Jr. et al. ................ | 364/513 |
| 4,158,887 | 6/1979 | Kosugi ................................ | 364/723 |
| 4,221,997 | 9/1980 | Flemming ............................ | 364/513 |
| 4,308,584 | 12/1981 | Arai .................................... | 364/513 |
| 4,409,650 | 11/1983 | Noguchi ........................ | 364/169 X |
| 4,432,063 | 2/1984 | Resnick ........................... | 318/568 X |
| 4,445,184 | 4/1984 | Noguchi ............................. | 364/513 |

OTHER PUBLICATIONS

Robot Manipulators; MIT Press; by Richard Paul, 1981.

Primary Examiner—Jerry Smith
Assistant Examiner—Allen MacDonald
Attorney, Agent, or Firm—Antonelli, Terry & Wands

[57] ABSTRACT

A control system and method for controlling a hand of an industrial robot are disclosed wherein the hand is driven at a predetermined speed along a polygonal path defined by a plurality of straight lines which interconnect a plurality of point coordinates taught to the robot. The straight lines are continuously interconnected by a parabola at predetermined locations in the vicinity of the centers of the straight lines, wherein the hand is continuously moved along the parabola from a straight line to the next straight line, and wherein the parabola is generated by dividing a span between two predetermined positions through arithmetic linear interpolation technique in a manner in which points located between the predetermined positions are defined on a straight line interconnecting the two predetermined positions.

15 Claims, 20 Drawing Figures

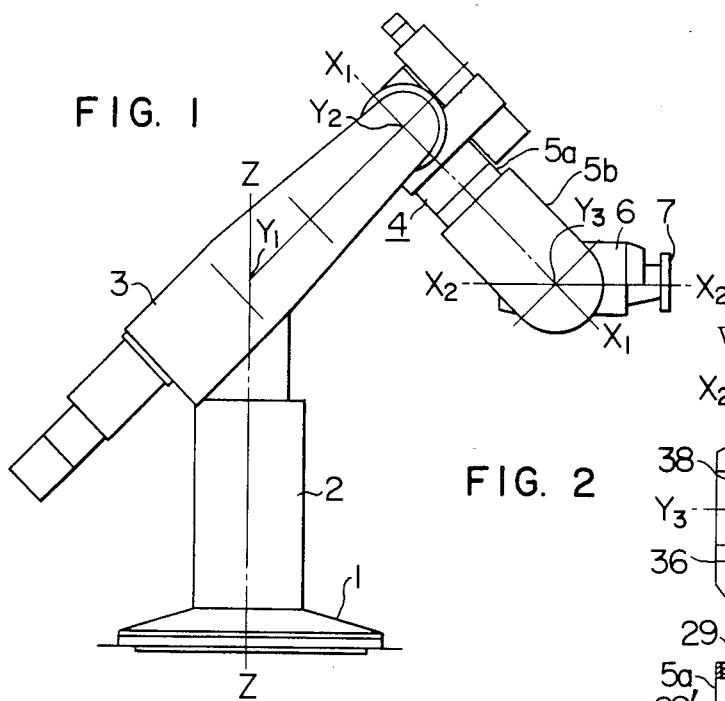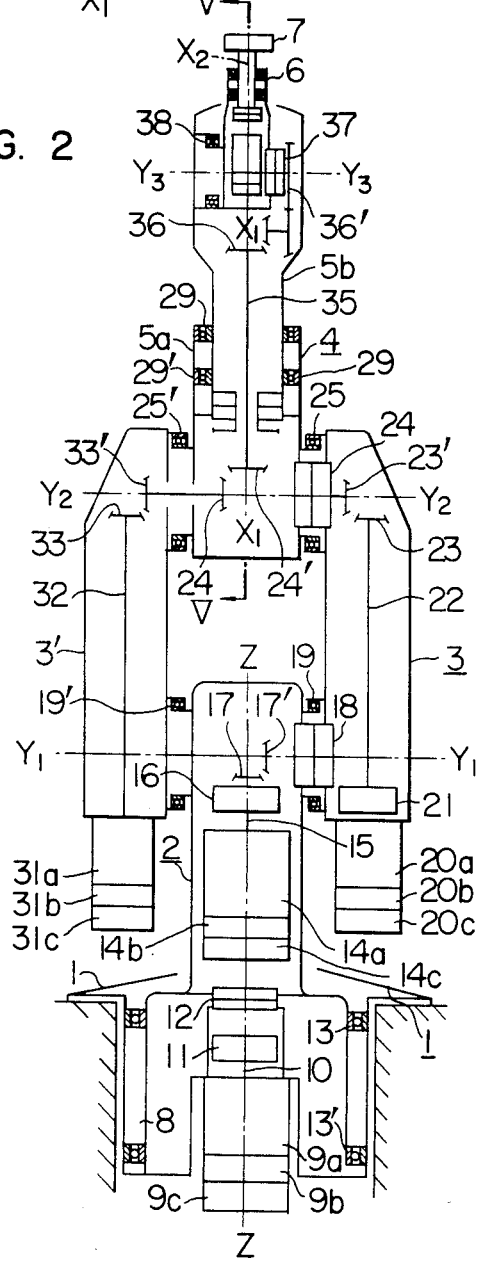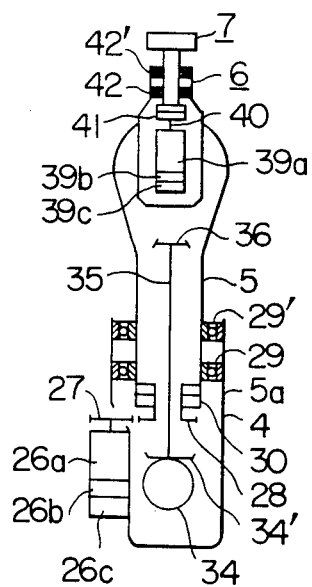

PARABOLIC POSITION AND ATTITUDE INTERPOLATION FOR A ROBOT HAND

BACKGROUND AND SUMMARY OF THE INVENTION

The present invention relates to a control system for controlling a hand of an industrial robot.

Many industrial robots have heretofore been developed for use in materials handling or spot welding and adapted to be driven under PTP control (i.e. point-to-point control). Recently, the robots tend to be increasingly used in various industrial fields for arc welding, assembling and others, and the PTP control tends to be replaced by a CP control (i.e. continuous path control) which assures higher performance.

The CP control involves a method of storing in a memory device data obtained at every sampling time of the control circuit incorporated in the robot. This method however requires an enormous storage capacity because a great deal of data must be stored for the particular arc welding, assembling or other operations to be performed. Such being the circumstances, the teaching is usually effected under the PTP control and a continuous path is generated through linear interpolation of spans between the points given by the teaching for driving the robot.

In this connection, it is noted that in case the hand of the robot is caused to move at a certain speed along the path defined by two line segments so as to pass the points determined through the linear interpolation, acceleration would become infinite at a nodal point of the path, making the control impossible, unless the path is so modified in the vicinity of the nodal point that one line segment passes over to the other succeeding line segment continuously along a curved path. To this end, there have been proposed methods of interconnecting the two polygonal line segments by an arc or a curve of multi-degree. However, these prior art methods are disadvantageous in that difficulty is encountered in arithmetically determining the path on a real time base upon driving the robot because the amount of calculations for determining the path will be significantly increased and that the teaching becomes extremely complicated. For these reasons, it is difficult to adopt the prior art methods mentioned above for practical applications.

The robot's hand thus has to be stopped at the taught point, providing a major cause for elongating the time required for the operation of the robot.

Further, for controlling the attitude of the robot's hand by resorting to interpolation, a rotation angle or deviation in contraposition of the robot mechanism is divided equally. However, since the rotation angle mentioned above is inherently in a non-linear relation with the attitude, there will be a remarkable difference in data for different types of robots. This is disadvantageous because when the robot is to be driven under a direct numerical control (DNC) or the like, data can not be used in common for different types of robots, while linear interpolation which allows a uniform rotation speed is difficult and, therefore, also disadvantageous.

Further, there is known a method of controlling the attitude of the robot's hand through interpolation by making use of a Eulerian angle. However, representation by Eulerian angle includes a singular point, as the result of a which an attitude which can not be represented in terms of a Eulerian angle is inevitably present. Besides, the linear interpolation which makes the rotation speed uniform is difficult, as is the case of the control performed on the basis of the rotation angle described above.

With a view to solving the problems arising in conjunction with the control of the robot's hand described above, the present invention provides a method of interpolating the path by continuously interconnecting a plurality of straight line segments with parabola by resorting only to the arithmetic interpolating functions inherently incorporated in the conventional robot. Since the inventive method can be carried out solely by the operation of the linear interpolation, the addition of a long program is not necessary, whereby the amount of calculations may remain small, providing the operation of a real time base to drive the robot. As to the attitude interpolation of the robot's hand, there is proposed according to the invention a method of driving the robot through interpolation of the rotation angle with the attitude being represented by two unit vectors. According to the inventive method, interpolation of the attitude of the robot's hand can be accomplished with an improved accuracy.

Accordingly, it is an object of the present invention to provide a control system for a robot's hand which is capable of determining the path for the movement of a robot's hand through interpolation based on simplified arithmetic processing on a real time base.

It is another object of the present invention to provide a robot hand controlling system which is capable of varying the speed of the hand at a uniform acceleration through simplified arithmetic processing.

According to a general aspect of the present invention, arithmetic interpolation processing is employed to divide spans among individual positions set for determining a path along which the robot's hand is to be moved, whereby the path for the robot's hand originally defined by a polygon or line segments is made continuous by a parabola in the vicinity of a nodal point so that the hand moves at a uniform acceleration in the vicinity of the nodal point.

According to another general feature of the invention, the attitude of the hand is represented by two unit vectors $\vec{f}$ and $\vec{g}$, wherein a rotation axis for motion of the robot's hand on the basis of two sets of given data $(\vec{f_o}, \vec{g_o})$ and $(\vec{f_n}, \vec{g_n})$ representative of attitudes of the hand, respectively, and the rotation angle required for the robot's hand to move from the one attitude given by $(\vec{f_o}, \vec{g_o})$ to the other $(\vec{f_n}, \vec{g_n})$ about the rotation axis defined by $(\vec{f_o}-\vec{f_n}) \times (\vec{g_o}-\vec{g_n})$ is interpolated for driving the robot's hand.

The above and other objects, features and advantages of the present invention will become more apparent by reading the following description of the preferred embodiments of the invention made with reference to the accompanying drawings.

BRIEF DESCRIPTION OF THE DRAWINGS

FIG. 1 is a side view showing schematically an industrial robot to which the present invention may be applied;

FIG. 2 is a view to show a driving mechanism for the robot;

FIG. 3 is a view to show the same along the line $X_1$—$X_1$ in FIG. 2;

DETAILED DESCRIPTION

Figure 6:
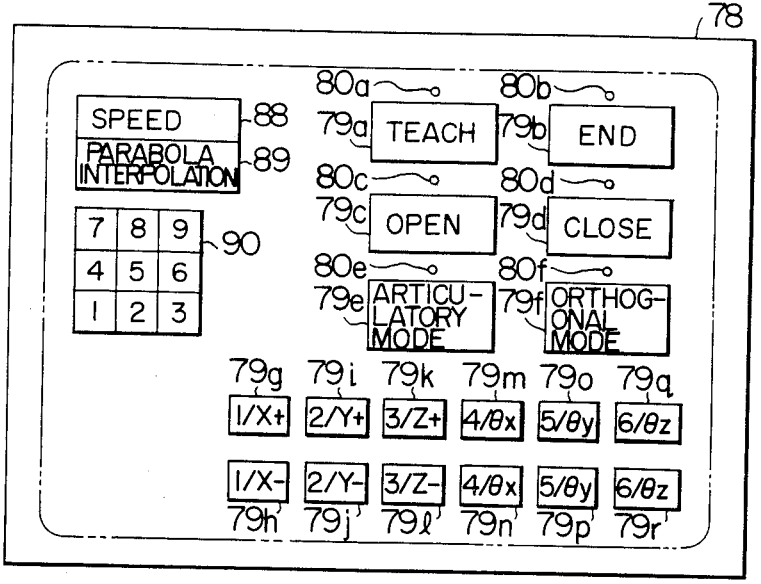
FIG. 6 is a view showing a manipulating panel of a teaching box.

In the following, the present invention will be described in concrete terms by referring to the accompanying drawings.

Referring to FIGS. 1, 2 and 3, there is shown an example of an articulated robot having six degrees of freedom to which this invention is applied and which is disclosed in the copending U.S. patent application Ser. No. 285637 filed July 21, 1981 and assigned to the present assignee (the corresponding European Patent Application No. 81105693.6 filed July 10, 1981). FIG. 1 is a side view of an articulated industrial robot to which the principle of the invention can be applied. The articulated industrial robot has a base 1, a turret 2, an upper arm 3, a forearm 4 and a wrist 6. The robot has 6 (six) kinds or degrees of freedom: namely a rotation around a Z-axis, rotation of the upper arm 3 around $Y_1$-axis, rotation of the forearm 4 around a $Y_2$-axis, rotation of a lower half part 5b of the forearm around an $X_1$-axis, rotation of the wrist 6 around a $Y_3$-axis, and rotation of tool mount or hand 7 around an $X_2$-axis.

FIG. 2 illustrates a driving system for each of the motions mentioned above, in the state in which the upper arm 3 and the forearm 4 of the robot shown in FIG. 1 are stretched, while FIG. 3 is a sectional view taken along the line $X_1$—$X_1$ of FIG. 2. More specifically, the turret 2 is rotatably supported on the base 1 through rotary bearings 13 and 13'. An output shaft 10 of a rotary drive source 9a (such as a D.C. servo motor) fixed to the base 1 is connected to a reduction gear 12 (such as a harmonic reduction gear) also fixed to the base 1, via a safety brake 11 (such as an ON/OFF type of solenoid brake) which is also fixed to the base 1. The low-speed side, i.e. the output side of the reduction gear 12 is fixed to the turret 2, so that a rotary drive source 9a imparts to the turret 2 rotation around the Z-axis as shown in FIGS. 1 and 2.

A rotary driving source 14a (such as a D.C. servo motor) for driving the upper arm 3 is mounted in the turret 2. The output shaft 15 of the rotary driving source is connected through a safety brake 16 and a pair of bevel gears 17 and 17' to a reduction gear 18 fixed to an upper part of the turret 2. The pair of upper arms 3 and 3' are rotatably secured to an upper portion of the turret 2 through respective rotary bearings 19 and 19'. The low speed output of the reduction gear 18 is connected to one of the upper arms 3 so that the rotary driving source 14a imparts to the upper arms 3 and 3', the rotation around the $Y_1$-axis shown in FIG. 2.

A rotary driving source 20a (such as a D.C. servo motor) for driving the forearm 4 is attached to the rear end of the upper arm 3. The output shaft 22 of the driving source 20a is connected through a safety brake 21 and a pair of bevel gears 23 and 23' to a reduction gear 24 fixed to the lower end of the upper arm 3. An upper half portion 5a of the forearm 4 is rotatably clamped between the upper arms 3 and 3' through respective rotary bearings 25 and 25' and connected to the low speed output shaft of the reduction gear 24. In consequence, the rotary driving source 20a attached to the rear end of the upper arm 3 imparts to the upper half part 5a of the forearm the rotation around the $Y_2$-axis as shown in FIGS. 1 and 2.

A lower half part 5b of the forearm 4 is rotatably secured to the end of the upper half part 5a of the forearm through bearings 29 and 29' for free rotation around the $X_1$-axis as shown in FIGS. 1 and 2. A gear 27 is attached to the output shaft of a rotary driving source 26a (such as a D.C. servo motor) fixed to the upper half part 5a of the forearm. Another gear 28 is fixed to the input shaft of a reduction gear 30 which is fixed to the upper half part 5a and having a low speed output connected to the lower half part 5b of the forearm. These gears 27 and 28 mesh with each other so that the rotary driving source 26a causes the lower half part 5b of the forearm to rotate around the $X_1$-axis.

The driving system constituted by the rotary driving source 20a for driving the upper half part 5a of the forearm, the output shaft 22, the bevel gears 23 and 23' and so forth is mounted only on one of the two upper arms 3. Fixed to the rear end of the other upper arm 3' is a rotary driving source 31a (such as a D.C. servo motor) for driving the wrist 6. The output shaft 32 of this rotary driving source 31a is coupled through a pair of bevel gears 33 and 33' to the upper half part 5a and further to the end portion of the lower half part 5b of the forearm through another pair of bevel gears 34 and 34' and a rotary shaft 35. The wrist 6 is rotatably secured to the lower half part 5b of the forearm through a rotary bearing 38. A reduction gear 37 fixed to the lower half part 5b has a low-speed output coupled to the wrist 6. The rotary shaft 35 is connected at its end to the input shaft of the reduction gear 37 through bevel gears 36 and 36' so that the rotary driving source 31a fixed to the rear end of the upper arm 3' imparts to the wrist 6 a rotation around the $Y_3$-axis shown in FIG. 1 and 2. The transmission of power at the inside of the forearm 4 is achieved by the rotary shaft 35 which is coaxial with the axis of rotation of the lower half part 5b of the forearm and extending through a cavity or bore formed in the gear 28 and the reduction gear 30 for driving the lower half part 5b. Therefore, the rotary motion of the lower half part 5b can be achieved without substantially hindering the operation of the driving system.

A rotary driving source 39a (such as a D.C. servo motor) is mounted within the wrist 6 and has an output shaft 40 connected to the input shaft of the reduction gear 41 fixed to the wrist 6. The low-speed output end of the reduction gear 41 is connected to the tool mount or hand 7 which is rotatably supported by the wrist 6 through rotary bearings 42 and 42' so as to impart to the hand the rotation around the $X_2$-axis shown in FIGS. 1 and 2.

Figure 4:
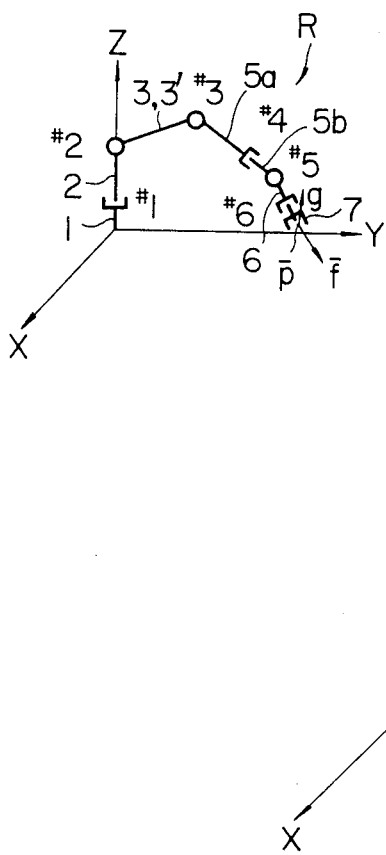
FIG. 4 is a view showing a polygonal path.

The articulated industrial robot R imparted with six varieties of freedom as elucidated above is illustrated in a form of a schematic model in FIG. 4.

Next, by referring to FIGS. 5 and 6, description will be made of a control unit 70 for controlling the articulated robot R having six types of freedom and a teaching unit for teaching information about a previously programmed path and speeds for causing the robot R to be operated or moved along the predetermined path at the programmed speeds on a point-to-point base.

The control unit 70 and the robot mechanism R constitute a position control system in which output values produced by pulse encoders PE coupled to respective actuators M are fed back to the control unit 70 through a counter 75, whereby differences between the target or desired coordinate values determined previously by a microprocessor (A) 72 and the corresponding transformed values of the encoder outputs are converted into analog values by means of a digital/analog (D/A) converter 74 for driving the actuators M. In accordance with the assumption that the robot R is imparted with 6 types of freedom, there are provided six actuators M, six tachometer generators TG and six pulse encoders PE. By the way, FIG. 6 illustrates in a plan view a teaching box 78. This teaching box incorporates a basic teaching job executing manipulator unit for storing position and attitude data or information in a storage by manually operating the conventional robot. With the terminology "position and attitude data or information", it is intended to mean nine data which are represented by orthogonal coordinate values of the robot including position data of the tool mount 7 on hand positions $\bar{p}$ in an XYZ-coordinate system (i.e. X-coordinate value, Y-coordinate value and Z-coordinate value) and two unit vectors $\{\vec{f}(\theta_x, \theta_y, \theta_z), \vec{g}(\theta_x, \theta_y, \theta_z)\}$.

There are provided on the teaching box 78, those switches 79g, 79h, 79i, . . . , 79r which indicate translational movements of the hand 7 along the coordinate axes and rotational movements thereof around the coordinate axes for driving in the orthogonal mode. Signs (+) and (−) attached to these switches indicate the directions, i.e. forward and backward directions, respectively, of the corresponding motion or movements. Also in the articulation mode, the same switches are used for driving separately and singularly the articulations attached with the corresponding reference numbers (i.e. #1, #2, . . . , #6). When execution of a teaching program by the microprocessor (A) 72 (stored in a read-only memory or ROM 94) is started, interpretation of commands inputted by actuating input keys provided on the teaching box 78 is performed after initialization processing of the relevant data. More specifically, when certain keys of the basic function teaching manipulator field are pressed, the corresponding input data is fetched by a microprocessor 97 through a keyboard display interface 86 periodically under the timing of a clock signal produced by a clock generator 81. Subsequently, in response to a data transfer request signal issued from the control unit 70, the code data to be supplied to the microprocessor (A) 72 through a bus line 85, an asynchronous communication interface adapter (ACIA) 83, level changer 82 and hence a serial interface (I/F) 76 and a bus line 73 is analytically determined by the microprocessor (B) 97 in dependence on which type of processing is to be executed by the microprocessor (A) 72, whereby the data for the relevant processing routine is transferred to the microprocessor (A) 72, whereupon the execution of the program proceeds to the next phase.

In this connection, detailed description will be omitted as to the teaching processing for loading the positional coordinate values of the robot in the random access memory or RAM 77 (triggered by the switch 79a), a mode alternating processing for selectively determining whether the robot is to be operated in the articulation mode independent of the individual axes or the hand 7 is to be operated along the axes of the orthogonal coordinate system in the orthogonal mode when the robot is manually operated (activated by the switches 79e and 79f), a processing for opening and closing of the hand 7 (activated by the switches 79c and 79d), and a processing for lighting those of light emission diodes of LED's 80a, 80b, . . . , 80f located above the key switches 79a, 79b, . . . , 79f, respectively, which correspond to these switches which have been pressed or actuated. The last mentioned processing is executed by the microprocessor (B) 87 for indicating the pressed ones of the above mentioned processing key switches 79a, 79b, . . . , 79f.

In the case of the processing for the motion of the hand as brought about by pressing the keys 79g, . . . , 79r, target or desired values for the selected operation mode determined by the mode change-over processing are arithmetically determined, whereupon they are stored in the RAM 77 as the target values represented by the orthogonal coordinate values or the articulation coordinate values. More specifically, the coordinate values in concern are so determined that the corresponding displacements are progressively increased within a range not exceeding the maximum displacement during a period beginning with the first pressing of the corresponding keys and ending with the release of them, while the displacements are progressively decreased to zero after the release of the keys. The coordinate values thus determined are added to or subtracted from the orthogonal coordinate values or the articulation coordinate values determined in the preceding cycle in dependence on the directions of the movements, to thereby determine the target coordinate values for the instant cycle. These target coordinate values thus obtained are transformed to the corresponding encoder output values for the respective axes of the robot and compared with the actual values read out from the pulse encoders PE through the counter 75. The resulting differences, if present, are supplied to the D/A converter 74 in terms of numbers of pulses to thereby feed speed commands to servo-drivers 96 provided for the axes of the robot, respectively. Thus, the robot R is operated.

When the hand 7 of the robot R has been moved to the required position and/or attitude in this way, the operator can now press the teaching key switch 79a. Then, the count outputs $\theta_1, \theta_2, \ldots, \theta_6$ of the counter 75 representative of the counted pulses output from the pulse encoders PE coupled to the actuators M, respectively, are fetched by the microprocessor (A) 72. On the basis of these values $\theta_1, \theta_2, \ldots,$ and $\theta_6$, the microprocessor (A) 72 determines arithmetically the position-/attitude quantities $\bar{p}$, $\vec{f}$ and $\vec{g}$ of the hand 7 with the aid of an arithmetic processor 95. The values thus determined are stored as the position quantity $\bar{p}_a(X_a, Y_a, Z_a)$ of a point A (FIG. 7) and the attitude quantities $\vec{f}_a$ ($f_{xa}$, $f_{ya}$, $f_{za}$) and $g_a$ ($f_{xz}$, $f_{ya}$, $f_{za}$) of the hand at the point A, where $\bar{p}_a(X_a, Y_a, Z_a) = \bar{p}(\theta_1, \ldots, \theta_6)$, $\vec{f}_a(\theta_{xa}, \theta_{ya}, f_{za}) = \vec{f}(\theta_1, \ldots, \theta_6)$ and $g_a(g_{xa}, g_{ya}, g_{za}) = \vec{g}(\theta_1, \ldots, \theta_6)$. The speed $v_a$ at which displacement from the point A to a next point is to occur is commanded by a speed switch 88 and ten keys 90. The value of the commanded speed is always displayed by the display 87. In the similar manner, teaching is made as to the position $\bar{p}_b(X_b, Y_b, Z_b)$ of the point B and the corresponding information $\vec{f}_b$ ($f_{xb}$, $f_{yb}$, $f_{zb}$), $\vec{g}_b$ ($g_{xb}$, $g_{yb}$, $g_{zb}$) of the hand as well as the speed information $v_b$. Further, information of the point C, $\bar{p}_c(X_c, Y_c, Z_c)$, $\vec{f}_c$ ($f_{xc}$, $f_{yc}$, $f_{zc}$), $\vec{g}_c$ ($g_{xc}$, $g_{yc}$, $g_{zc}$) and $v_c$ are taught. By the way, when a parabolic interpolation is to be effected for the point B, the switch 89 is closed in the point (B) teaching mode to designate the parabolic interpolation.

Figure 7:
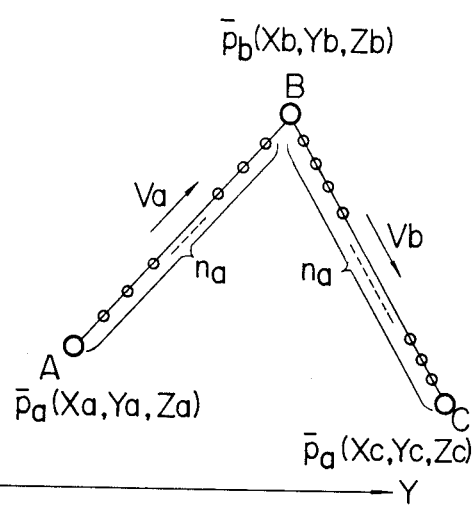
FIG. 7 is a view to illustrate linear interpolation of two line segments.

Next, description will be made of the parabolic interpolation effected on the basis of the taught information about the points A, B and C (inclusive of the case where these points A, B and C lie on a straight line). FIG. 7 shows an example of an equidistant interpolation mode along two line segments. Referring to FIG. 7, the three points A, B and C represent the positions $\bar{p}_a(X_a, Y_a, Z_a)$, $\bar{p}_b(X_b, Y_b, Z_b)$ and $\bar{p}_c(X_c, Y_c, Z_c)$ of the hand 7 taught in the robot R, and the hand is to be moved at the speed $v_a$ along the line segment $\overline{AB}$ and at the speed $v_b$ along the line segment $\overline{BC}$. In the course of the motion, the microprocessor (A) 73 determines the positions passed by the hand of the robot R on these line segments at every sampling time T, to control the robot with the thus determined positions being employed as the target or desired positions. The number of samplings effected during the movement of the hand 7 of the robot R along the line segment $\overline{AB}$ is given by the following expression:

$$n_a = [\overline{AB}/v_a T] \quad (1)$$

In the similar manner, the number of samplings made during the passage along the line segment $\overline{BC}$ is given by $$n_b = [\overline{BC}/v_b T] \quad (2)$$

In the above expressions (1) and (2), the blacket [ ] represents that the sampling number $n_a$ is a natural number falling within a range given by $\overline{AB}/v_a T \leq n_a \leq \overline{AB}/v_a T + 1$ and that $n_b$ is also a natural number in a range where $\overline{AB}/v_b T \leq n_b < \overline{AB}/v_b T + 1$. Accordingly, the target or desired points at the respective sampling time points correspond to those derived by dividing equally the line segments $\overline{AB}$ and $\overline{BC}$ by $n_a$ and $n_b$, respectively. However, it should be noted that driving of the robot's hand in this way would require that the acceleration of the hand at the nodal point B be infinitely increased, thus making it practically impossible to drive the robot's hand. With a view to evading this difficulty, it is taught according to the present invention that the movement of the robot's hand is caused to depart from the direction of the line segment $\overline{AB}$ at the sampling point which precedes the nodal point B by a predetermined sampling number n so that the robot's hand will follow a parabolic path to reach the line segment $\overline{BC}$ by skipping the n sampling points leading to the nodal point B.

Figure 8:
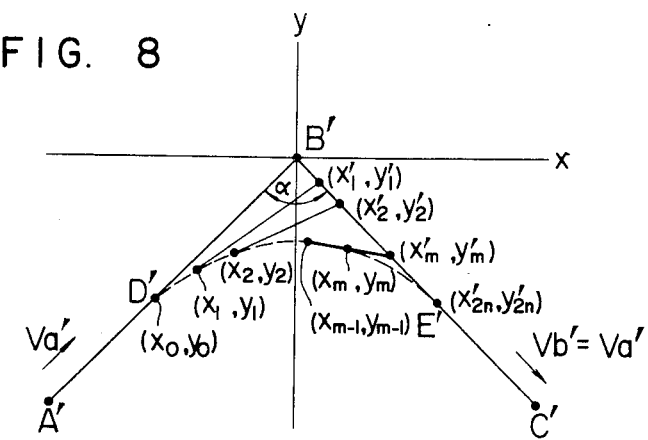
FIG. 8 is a view to illustrate a method of making the path continuous by a parabola according to the teaching of the invention.

Now, the principle of the present invention will be elucidated in detail on the illustrative assumption that the robot's hand is moved on a two-dimensional plane (i.e. the plane defined by the axes x and y). Referring to FIG. 8, it is assumed that the speed $v_a'$ of the robot's hand 7 at which the latter is caused to move along the line segment $\overline{A'B'}$ is equal to the speed $v_b'$ of the robot hand moving along the segment $\overline{B'C'}$. Further, positions of the three points A', B' and C' are assumed to be so selected with respect to the x-axis and y-axis of the orthogonal plane coordinate system that the point B' coincides with the origin of the coordinate and the internal angle $<A'B'C'$ is bisected by the y-axis, with the x-axis extending perpendicularly to the y-axis. A parabolic equation is expressed as follows:

$$Y = ax^2 + b \quad (3)$$

where a and b represent constants, respectively. Tangent to the parabola is then given by the following differential equation:

$$y = \frac{dy}{dx} x + c \left( \frac{dy}{dx} \right)^2 + d \quad (4)$$

where c and d represent constants, respectively. Differentiation of the equation (4) by x results in the following singular solution:

$$\frac{dy}{dx} = -\frac{x}{2c} \quad (5)$$

Substituting this solution to the equation (4), the latter can be rewritten in a simplified form as follows:

$$y = -\frac{x^2}{4c} + d \quad (6)$$

From the equations (3) and (6)

$$a = -\tfrac{1}{4}c \quad (7)$$

and $$b = d \quad (8)$$

Here, the point which precedes the nodal point or origin B' by the predetermined sampling number n is represented by D', while the point which follows the point B' by the number n samplings is represented by E'. Assume that the length of the line segments $\overline{D'B'}$ and $\overline{B'E'}$ is equal to each other and represented by l ($= n \cdot v_a' T$ and $n \cdot v_b' T$). On these conditions, the tangents to the parabola at the points D' and E' pass through the origin of the x-y coordinate. Accordingly, when the angle $<A'B'C'$ is represented by $\alpha$, the coordinates of the point D' are given by $$-l \cdot \sin \frac{\alpha}{2}$$

and $$-l \cdot \cos \frac{\alpha}{2},$$

respectively, while the inclination of the tangent at that point D' is given by $$+1/\tan \frac{\alpha}{2}.$$

Similarly, the coordinates of the point E' are given by $$+ l \cdot \sin \frac{\alpha}{2}$$

and $$-l \cdot \cos \frac{\alpha}{2},$$

respectively, while inclination of the tangent at this point E' is given by $$-1/\tan \frac{\alpha}{2}.$$

Further, on the assumption that the tangents pass the origin, following relation is derived from the equation (4). Namely, $$c \left( \frac{dy}{dx} \right)^2 + d = \frac{c}{\tan^2 \frac{\alpha}{2}} + d = 0 \quad (9)$$

Further, from the equation (3), a can be determined as follows:

$$a = \frac{dy}{dx} / 2x = - \frac{\cos \frac{\alpha}{2}}{2l \sin^2 \frac{\alpha}{2}} \quad (10)$$

From the equations (7), (8), (9) and (10), $$c = l \cdot \sin \frac{\alpha}{2} / 2 \cos \frac{\alpha}{2}$$

and $$d = \frac{l}{2} \cos \frac{\alpha}{2}$$

are determined and put into the equation (6), whereby the equation for the parabola is expressed as follows:

$$y = - \frac{\cos \frac{\alpha}{2}}{2l \sin^2 \frac{\theta}{2}} x^2 - \frac{l}{2} \cos \frac{\alpha}{2} \quad (11)$$

The control for the robot is, so to say, a sampling control. Accordingly, the motion from the point D' to the point E' must be effected on the basis of data obtained through an integral number of samplings. When the position of the robot's hand on the parabolic path at m-th sampling counted from the point D' is represented by coordinates $x_m$ and $y_m$, then the coordinate $x_m$ is given by a below mentioned expression (12) because the motion in the direction of the x-axis is effected at a uniform or constant speed.

$$x_m = \frac{2l \cdot \sin \frac{\alpha}{2}}{2n} m - l \cdot \sin \frac{\alpha}{2} = \left( \frac{m}{n} - 1 \right) l \cdot \sin \frac{\alpha}{2} \quad (12)$$

By putting the above equation (12) into the equation (11), the latter can be rewritten as follows:

$$y_m = - \left\{ \left( \frac{m}{n} - 1 \right)^2 + 1 \right\} \frac{l}{2} \cdot \cos \frac{d}{2} \quad (13)$$

Further, inclination of the tangent to the parabola at the point ($x_m$, $y_m$) is given by $-(m/n-1) \cdot \cos (\alpha/2)$. The coordinates ($x_m'$, $y_m'$) of the intersection between this tangent and the line segment $\overline{B'C'}$ are given by $$(x_m', y_m') = \left( \frac{m}{2n} l \cdot \sin \frac{d}{2}, - \frac{m}{2n} l \cdot \cos \frac{d}{2} \right) \quad (14)$$

The points corresponding to these coordinates ($x_m$, $y_m$) have tangents which intersect equidistantly on the line segment $\overline{B'C'}$ when plotted by successively substituting 1, 2, 3, ..., for m in the above equation (14).

From the equations (12) and (14), the ratio of the distance between the points ($x_{m-1}$, $y_{m-1}$) and ($x_m$, $y_m$) to the distance between the points ($x_{m-1}$, $y_{m-1}$) and ($x_m'$, $y_m'$) is written as follows:

$$\frac{x_m - x_{m-1}}{x_m' - x_{m-1}} = \frac{\frac{l}{2} \cdot \sin \frac{d}{2}}{\left\{ \frac{m}{2n} - \left( \frac{m-1}{n} - 1 \right) \right\} l \cdot \sin \frac{d}{2}} = \quad (15)$$

$$\frac{1}{n + 1 - \frac{m}{2}}$$

In other words, the component $x_m$ is determined by dividing the line segment connecting the point ($x_{m-1}$, $y_{m-1}$) and ($x_m'$, $y_m'$) by the factor (n+1−m/2). The values of the component $y_m$ lie approximately on the same line segment when the difference between $y_m$ and $y_{m-1}$ is of a small value. For applying the results thus obtained to the interpolation for the path to be followed by the robot's hand along the parabola, resort may be made to the algorithm mentioned below.

In the first place, the line segment $\overline{B'E'}$ is divided equally (i.e. with equidistance) by 2n, and corresponding division points are represented by ($x_1'$, $y_1'$), ($x_2'$, $y_2'$), ..., ($x'_{2n}$, $y'_{2n}$) in the order beginning with the point located nearest to the point B'. Subsequently, a line segment connecting the point D' which corresponds to the coordinates ($x_0$, $y_0$) and the point ($x_1'$, $y_1'$) is divided equally by n+½, wherein the division point immediately following the point ($x_0$, $y_0$) is represented by ($x_1$, $y_1$). Next, a line segment defined between the points ($x_1$, $y_1$) and ($x_2'$, $y_2'$) is divided equally by n to determine a point ($x_2$, $y_2$), which is followed by the equi-division of a line segment between the points ($x_2$, $y_2$) and ($x_3'$, $y_3'$) by n−½ to determine a point ($x_3$, $y_3$), and so on. Then, a point determined at the 2n-th step coincides with the point E. Thus, a curve connecting the points ($x_1$, $y_1$), $(x_2, y_2), \ldots, (x_{2n}, y_{2n})$ approximates closely to a parabola.

Figure 9:
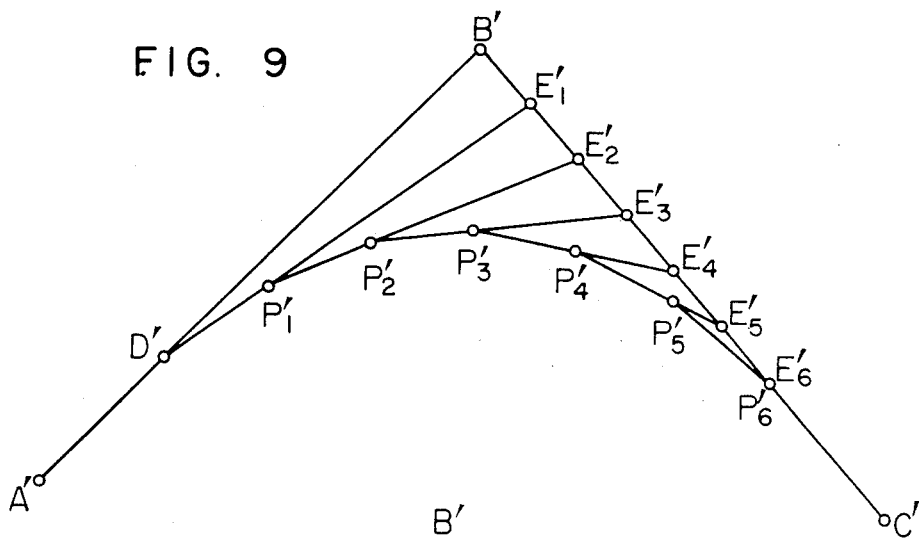
FIG. 9 is a view to illustrate a parabolic interpolation according to the invention.

As a more concrete example, interpolation for determining the path to be followed by the robot's hand will be described with the aid of illustration in FIG. 9 which is plotted on the assumption that n is equal to 3.

In this figure, $E_2'$, $E_4'$ and $E_6'$ represent three points at which a line segment $\overline{B'E_6'}$ corresponding to the segment B'E' is trisected and constitute parts of those points at which the line segments $\overline{A'B'}$ and $\overline{C'B'}$ are divided equally for interpolation. Further, $E_1'$, $E_3'$ and $E_5'$ represents bisecting points for the line segments $\overline{B'E_2'}$, $\overline{E_2'E_4'}$ and $\overline{E_4'E_6'}$, respectively. In the first place, the line segment $\overline{P_1'E_2'}$ is divided equally by $(3+\frac{1}{2}=3.5)$ to determine a point $P_1'$ which immediately follows the point D'. Subsequently, the line segment $\overline{P_1'E_2'}$ is trisected to determine a point $P_2'$. In similar manners, the line segments $\overline{P_2'E_3'}$, $\overline{P_3'E_4'}$, $\overline{P_4'E_5'}$ and $\overline{P_5'E_6'}$ are successively divided by $3-\frac{1}{2}(=2.5)$, 2, 1.5 and 1, respectively, to thereby determine points $P_3'$, $P_4'$, $P_5'$ and $P_6'$, respectively. The point $P_6'$ coincides with the point $E_6'$. In this way, as the robot's hand 7 is controlled so as to pass through the points $D_1$, $P_1'$, $P_2'$, ..., $P_5'$ and $P_6'$, the hand 7 follows a parabola in its movement.

Figure 10:
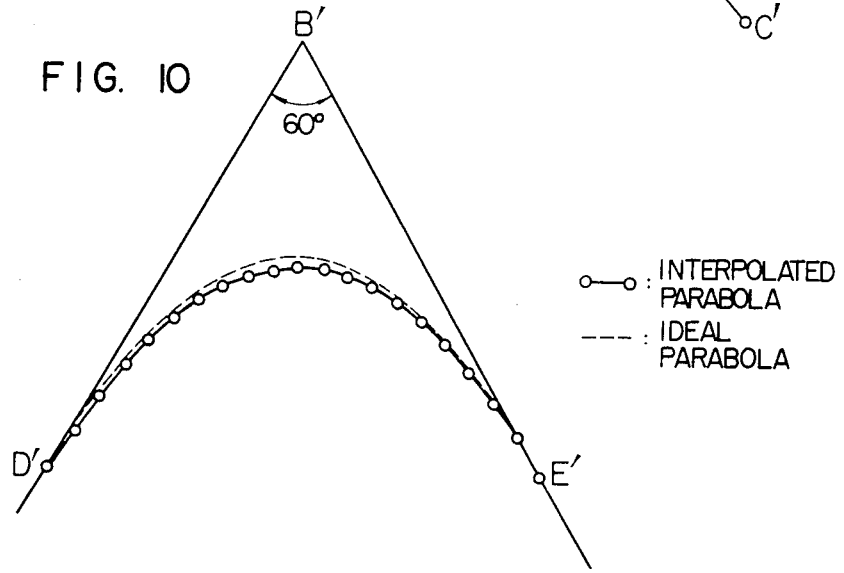
FIGS. 10 and 11 are views showing results of a parabolic interpolation.

A relationship between the interpolating points determined in the manner mentioned above and the parabola given by the equation (11) is graphically illustrated in FIG. 10, in which a series of small circles represents the interpolating points, while the ideal parabola is represented by a broken line curve. It will be seen that the broken line parabola substantially coincides with that depicted by the series of the interpolating points. Difference between the one and the other is due to the fact that the interpolating points are defined on the respective tangents to the parabola, as described above with reference to FIG. 9. In conjunction with the illustration of FIG. 10, it should be mentioned that n is selected equal to 10 with α being equal to 60°.

Figure 11:
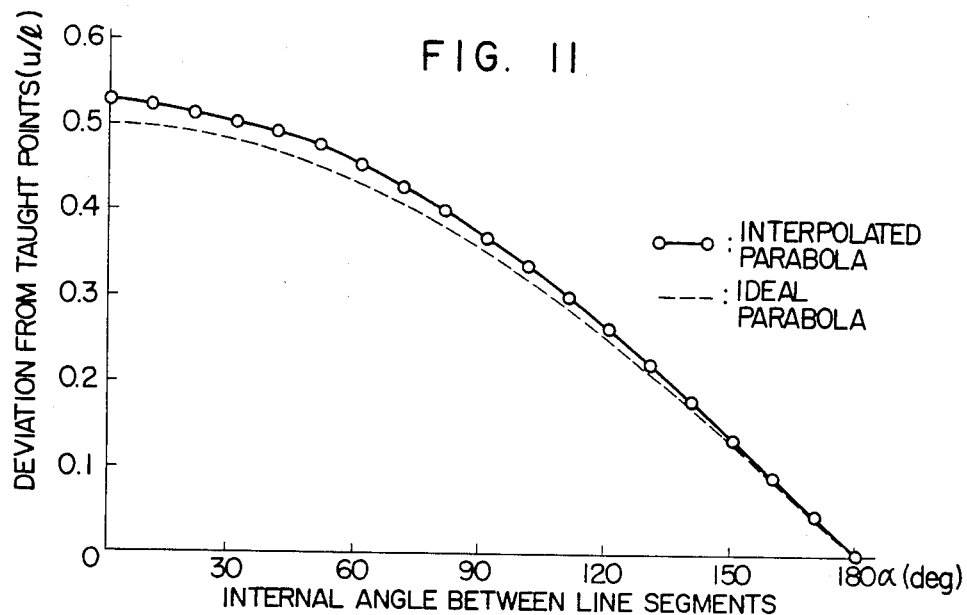

FIG. 11 illustrates a relationship between the internal angle α formed by the two line segments and maximum deviation from the taught path, which relationship has been arithmetically determined. A broken curve represents those values determined on the basis of the parabola in accordance with the equation (11), while a series of small cycles represent the results of interpolation.

Referring to FIG. 11, l represents the length of the line segment $\overline{D'B'}$ equal to $\overline{B'E'}$, and u represents the distance between the apex of the parabola and the point B' (refer to the equations 13 and 11). It will be seen that as the internal angle α becomes smaller, the error between the parabola and the interpolated curve becomes more significant. However, the error is never of such magnitude that it gives rise to a problem in attaining the smooth movement of the robbot's hand aimed to be realized through the parabolic interpolation.

Figure 12:
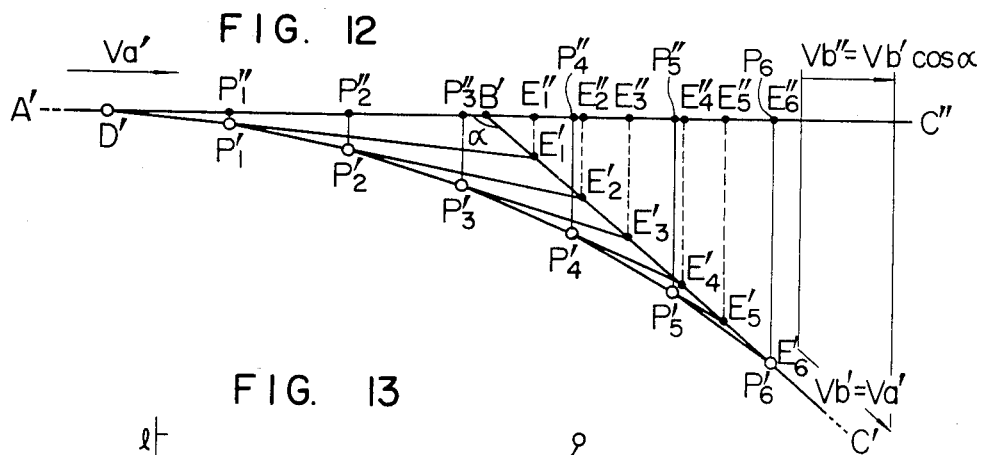
FIG. 12 is a view to illustrate a parabolic interpolation according to the invention applied to a case where the speed of the robot's hand is varied when moving along a straight line segment.

Next, referring to FIG. 12, it will be made clear how the procedure elucidated above can be validly applied to the case where the speed is to be changed from $v_a'$ to $v_b'$ during the motion of the robot's hand along the straight line segment $\overline{A'C''}$. It is assumed that the aforementioned procedure is applied to the case where the robot's hand is caused to be moved at a constant or uniform speed along the line segments $\overline{A'B'}$ and $\overline{B'C'}$, as is illustrated in FIG. 12. On this assumption, the components of motion along a line segment $\overline{A'C''}$ including a smaller line segment $\overline{A'B'}$ will be considered. Further, it is assumed that n is equal to 3 in the case of the illustration in FIG. 12. The points which correspond to the projections of points $E_i$ (where $i=1, 2, \ldots, 6$) on the line segment $\overline{A'C''}$ are represented by $E_i''$ where $i=1, 2, \ldots, 6$. When the speed of the robot's hand moved from the point A' to D' and hence from $E_1'$ to C' is represented by $v_a'$, the speed component $v_b''$ of the hand during the interval $\overline{E_6''C''}$ along the line segment $\overline{A'C''}$ is given by $v_b'' \cos \alpha$. Thus, when the aforementioned procedure is applied to the motion along the line segment $\overline{A'C''}$, the robot's hand is accelerated or decelerated at a uniform acceleration when moved from the point D' to $E_6''$. This proves that when the results of the parabolic path interpolation for the polygon A'B'C' are projected to the line segment $\overline{A'C''}$, proportionality is maintained in the relationship among the interpolating points, the interpolation is also linear, and that the linear interpolation along the line segment $\overline{A'C''}$ is thus equivalent to or same as the aforementioned procedure.

In other words, when the robot's hand is moved at a speed $v_a'$ along the line segment $\overline{A'D'}$, at a speed $v_b''$ along the line segment $\overline{E_6''C''}$ and accelerated or decelerated in the vicinity of the nodal point B' during the motion of the robot's hand along the linear path $\overline{A'C''}$, the line segment $\overline{A'B'}$ is divided in correspondence with the speed $v_a'$, while the segment $\overline{B'C''}$ is divided in correspondence with the speed $v_b''$ (i.e. the line segment $\overline{A'B'}$ is divided equally by the sampling number $n_a'$ equal to $[\overline{A'B'}/v_a'T]$, while the line segment $\overline{B'C''}$ is divided equally by the number of samplings $n_b'$ equal to $[\overline{B'C''}/v_b''T]$), and further the line segment $\overline{B'E_6''}$ is bisected to thereby determine the points $E_1''$, $E_2''$, ..., and $E_6''$. Subsequently, the segment $\overline{D'E_1''}$ is divided by 3.5 in accordance with the expression (15) to determine the point $P_1''$, which is followed by the trisection of the line segment $\overline{P_1''E_2''}$ for determining the point $P_2''$ and so on. In this manner, the speed of the robot's hand can be controlled with a uniform acceleration from the speed $v_a'$ to the speed $v_b''$.

When $v_a'$ is to be equal to zero in the control mentioned above, this means that the robot's hand is accelerated from the stationary state at a uniform acceleration during a period corresponding to 2n samplings. More specifically, when $v_a'=0$, both the points A' and B' are set at the point A' so that $\overline{A'B'}$ equals zero. Then, it is possible to control the speed of the robot's hand so as to be accelerated from the speed zero to the speed $v_b''$ at a constant or uniform acceleration through interpolation according to the procedure described above.

In a similar manner, when $v_b''$ is to be equal to zero, the robot's hand can be decelerated to the stationary state during the period corresponding to 2n samplings. Namely, when $v_b''=0$, both of the points B' and C'' are set at the point B' so that $\overline{B'C''}$ is zero. Through interpolation according to the procedure described above, the speed control can be carried out in such a manner that the speed $v_a'$ is decelerated to the speed zero at a uniform rate.

Figure 13:
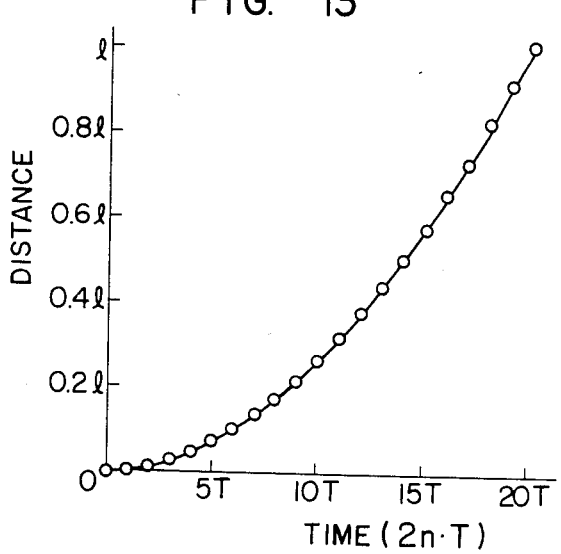
FIG. 13 shows graphically the result of the interpolation illustrated in FIG. 12.

In FIG. 13, there is illustrated the results of the interpolation for the speed control in which the robot's hand is accelerated from the zero speed state according to the method mentioned above. In the figure, a series of small circles represent the results of interpolation. This curve coincides well with the curve (not shown) which represents the parabola for the ideal acceleration. By the way, n is selected equal to 10 in this illustrative case. Accordingly, time 2nT is taken along the abscissa, where T represents the sampling time and 2n represents the number or times of the samplings. On the other hand, distance from the point A' is taken along the ordinate where l represents the distance from the point A' to the point C''.

Figure 14:
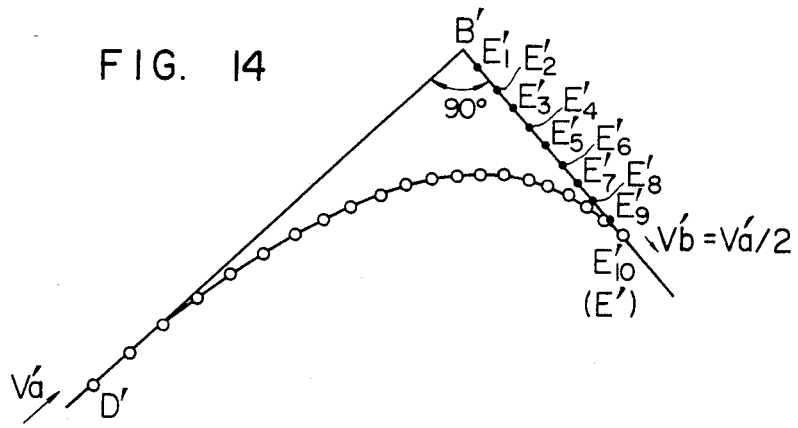
FIG. 14 is a view to illustrate a parabolic interpolation according to the invention applied to a case where the speeds of the robot's hand are different between line segments.

Next, referring to FIG. 14, description will be made on the interpolation in the case where the speed of the motion along line segments is varied. When the speed $v_a'$ at the point D' is varied to the speed $v_b'$ at the point E', the interpolation is effected in the following manner. Namely, sampling is made at the sampling number $n_a'$ $(=|A'B'|/v_a'T)$ along the line segment A'B', wherein interpolation is started from the point D' which corresponds to the sampling number n from the point B'. In the line segment $\overline{B'C'}$, sampling is made at the sampling number $n_b'$ $(=|B'C'|/v_b'T)$ and interpolation is terminated at the point E' which corresponds to n samplings effected starting from the point B'. Namely, $$|D'B'| = \frac{n}{n_a'}|A'B'|, \text{ and } |B'E'| = \frac{n}{n_b'}|B'C'|$$

Thus, $$\frac{|D'B'|}{|B'E'|} = \frac{n_b'|A'B'|}{n_a'|B'C'|} = \frac{v_a'}{v_b'}$$

The line segment $\overline{B'E'}$ is divided equally by 2n to thereby effect the parabolic interpolation with the aid of the procedure described hereinbefore in conjunction with FIG. 8. FIG. 14 shows an example of the parabolic interpolation in the case where $\alpha = 90°$, $n = 10$ and the speed $v_b'$ of the motion along the line segment $\overline{B'C'}$ is equal to a half of the speed $v_a'$ of the motion along the line segment $\overline{A'C'}$.

In the foregoing, the principle of the present invention has been described in conjunction with the motions of the robot's hand on a two-dimensional plane, by way of example.

In practice, however, the position of the robot's hand is defined by the three-dimensional coordinates $\bar{p}$ (X, Y, Z). In this case, the points A', B' and C' mentioned hereinbefore are arithmetically processed through the aforementioned procedure with the aid of the three-dimensional coordinates $\bar{p}_a$ ($X_a$, $Y_a$, $Z_a$), $\bar{p}_b$ ($X_b$, $Y_b$, $Z_b$) and $\bar{p}_c$ ($X_c$, $Y_c$, $Z_c$) illustrated in FIG. 15 to thereby determine the points for interpolation $\bar{p}_d$ ($X_d$, $Y_d$, $Z_d$), $\bar{p}_e$ ($X_e$, $Y_e$, $Z_e$), $\bar{p}_1$ ($X_1$, $Y_1$, $Z_1$), ..., $\bar{p}_m$ ($X_m$, $Y_m$, $Z_m$).

For example, the coordinates of the points $E_m$ are represented by $$X_m' = X_b + m\frac{\Delta X}{2},$$

$$Y_m' = Y_b + m\frac{\Delta Y}{2}, \text{ and}$$

$$Z_m' = Z_b + m\frac{\Delta Z}{2},$$

where $$\Delta X = \left(\frac{|BC|}{n_b}\right)_x = \frac{X_c - X_b}{n_b},$$

$$\Delta Y = \left(\frac{|BC|}{n_b}\right)_y = \frac{Y_c - Y_b}{n_b},$$

$$\Delta Z = \left(\frac{|BC|}{n_b}\right)_z = \frac{Z_c - Z_b}{n_b}, \text{ and}$$

$$n_b = \frac{|BC|}{v_bT} = \sqrt{|X_c - X_b|^2 + |Y_c - Y_b|^2 + |Z_c - Z_b|^2}/v_bT$$

where $n_b$ represents a natural number.

Coordinates of the point $p_m$ are:

$$X_m = X_{m-1} + (X_m' - X_{m-1})/\sqrt{|X_m' - X_{m-1}|^2 + |Y_m' - Y_{m-1}|^2 + |Z_m' - Z_{m-1}|^2} \times 1/(n + 1 - m/2),$$

$$Y_m = Y_{m-1} + (Y_m' - Y_{m-1})/\sqrt{|X_m' - X_{m-1}|^2 + |Y_m' - Y_{m-1}|^2 + |Z_m' - Z_{m-1}|^2} \times 1/(n + 1 - m/2),$$

and $$Z_m = Z_{m-1} + (Z_m' - Z_{m-1})/\sqrt{|X_m' - X_{m-1}|^2 + |Y_m' - Y_{m-1}|^2 + |Z_m' - Z_{m-1}|^2} \times 1/(n + 1 - m/2)$$

Coordinates for the point D are:

$$X_d = X_b - \left(\frac{|AB|}{n_a} \times n\right)_x = X_b - n \times \frac{X_b - X_a}{n_a},$$

$$Y_d = Y_b - \left(\frac{|AB|}{n_a} \times n\right)_y = Y_b - n \times \frac{Y_b - Y_a}{n_a},$$

and $$Z_d = Z_b - \left(\frac{|AB|}{n_a} \times n\right)_z = Z_b - n \times \frac{Z_b - Z_a}{n_a},$$

and $$n_a = \frac{|AB|}{v_aT} = \frac{\sqrt{|X_b - X_a|^2 + |Y_b - Y_a|^2 + |Z_b - Z_a|^2}}{v_aT}$$

where n is a natural number.

By the way, the line segments $\overline{AD}$ and $\overline{EC}$ may be linearly interpolated according to the hitherto known method disclosed, for example, in U.S. Pat. Nos. 3,909,600 and 3,920,972.

Next, manners in which the robot hand is controlled according to the present invention will be described by referring to FIGS. 5, 15 and 16.

Figure 5:
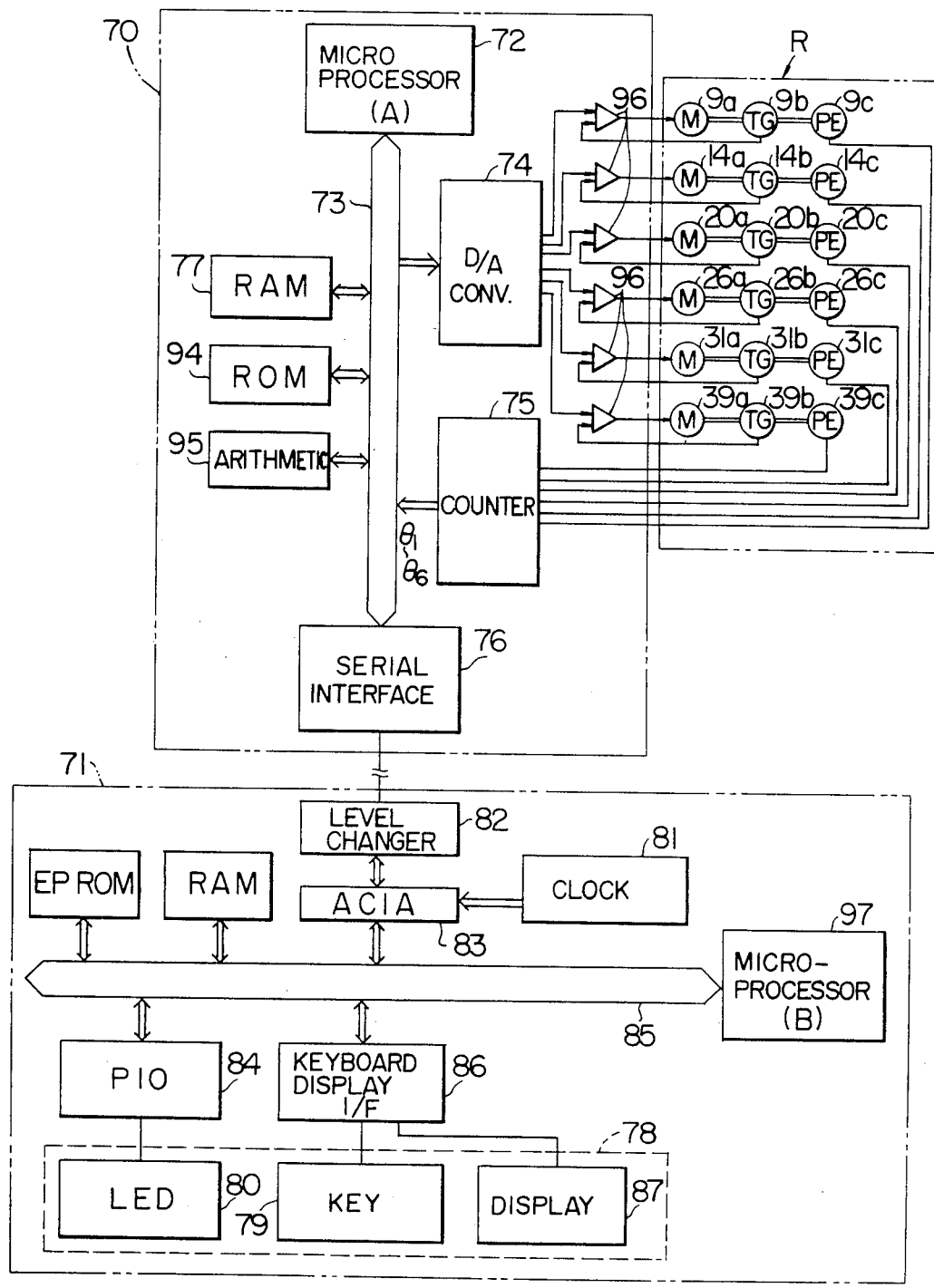
FIG. 5 is a view showing a general arrangement of a control system for the robot.

Referring to FIG. 5, there are coupled to the microprocessor (A) 72 through the bus line 73, the RAM 77, ROM 94, an arithmetic processor 95 storing tables of trigonometric functions and inverse trigonometric functions required for transformation of the orthogonal coordinates to angular or polar coordinates and imparted with multiplication/division functions, an output port 74 to the robot body R, an input port 75 for detection signals produced by detectors incorporated in the robot body R and the teaching unit 71.

At first, the robot R is driven to a predetermined position by manipulating the teaching unit 71. At this position, output values of the displacement detectors PE operatively coupled to the respective actuators M are read out and the spatial positions or points A, B and C of the robot's hand are arithmetically determined on the basis of the read values, with the results being subsequently stored in the RAM 77. The robot's hand 7 is thus driven along the straight lines which interconnect the points thus obtained. At that time, the speeds $v_a$ and $v_b$ at which the robot's hand is to be moved along the straight lines are inputted through the teaching unit 71.

In this conjunction, it should be noted that, according to the present invention, the given position data are interpolated with the aid of the procedures illustrated in FIGS. 8 to 14 on the basis of the position A, B and C of the robot's hand, the speeds $v_a$ and $v_b$ at which the robot's hand is driven along the straight line segments interconnecting the successive positions.

Figure 16:
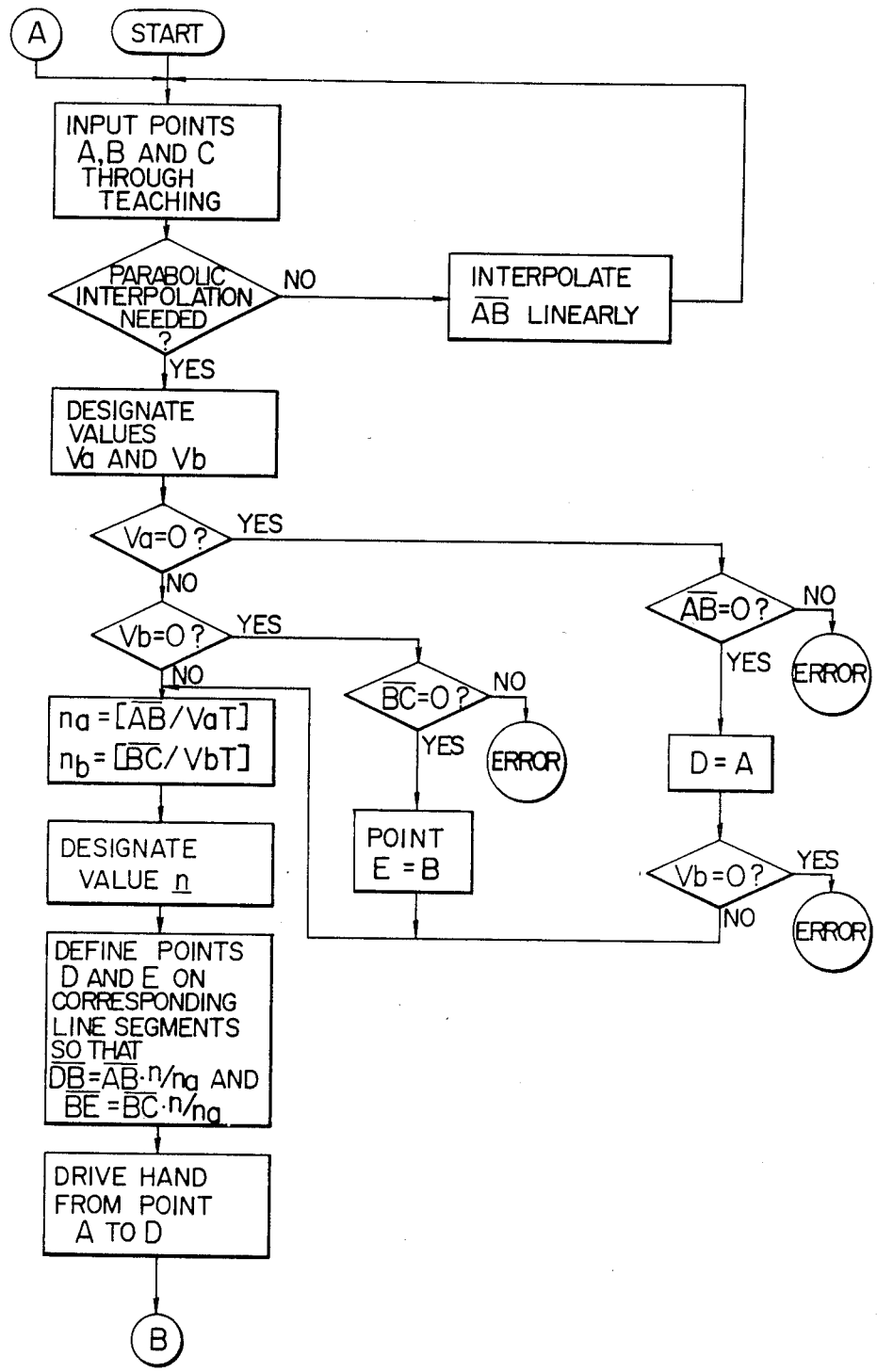
FIGS. 16 and 17 show flow charts to illustrate controlling processes for controlling the motion of the robot's hand according to the invention.
Figure 17:
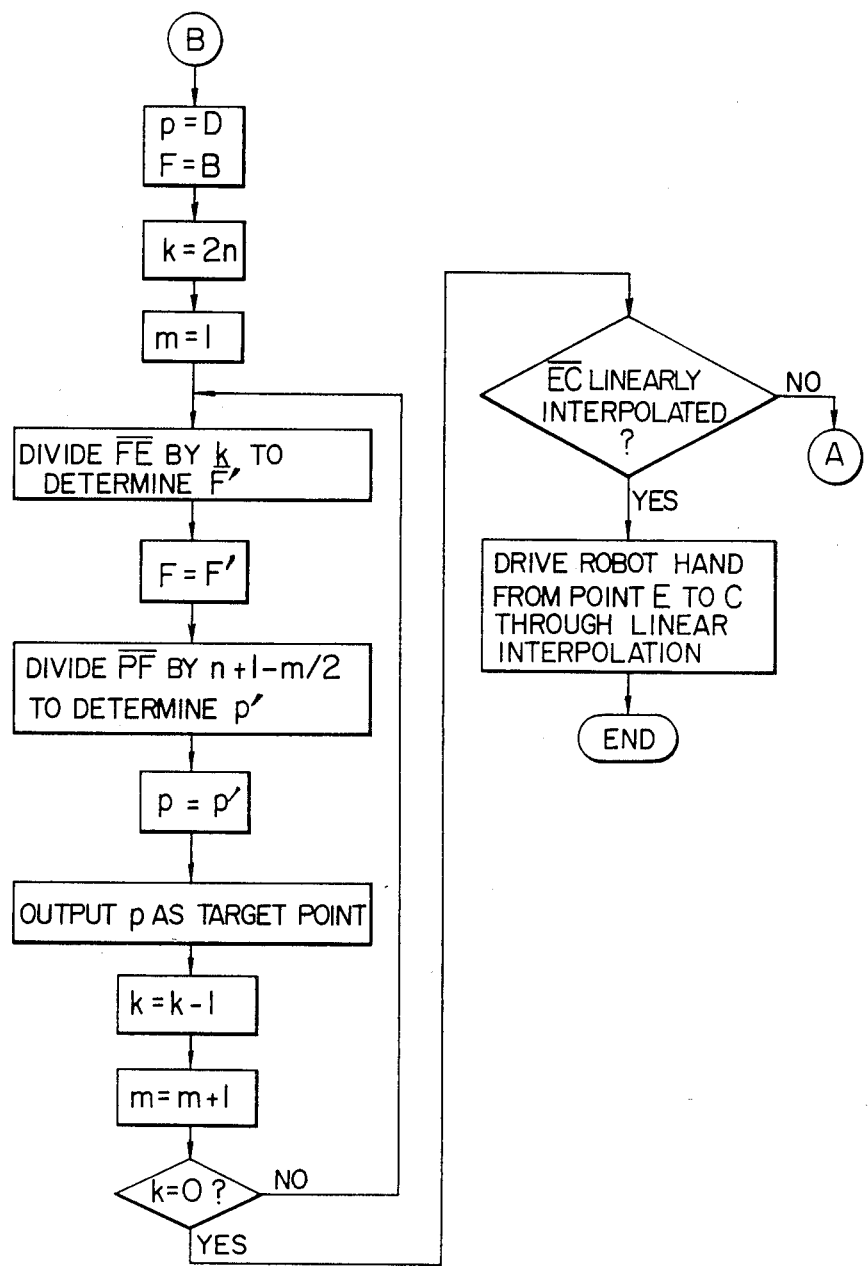

More specifically, the coordinates of the points A, B and C, the speed $v_a$ of the motion along the line segment $\overline{AB}$, the speed $v_b$ of motion along the line segment $\overline{BC}$ and data as to whether the parabolic interpolation is to be made or not are stored in the RAM 77, as is illustrated in flow charts of FIGS. 16 and 17.

In the case where the parabolic interpolation is not to be effected as judged from the data read out of the RAM 77, the microprocessor 72 arithmetically determines a path for linear motion of the robot's hand through the equidistant division interpolation on the basis of the coordinates of the points A and B, as is the case of the prior art.

Figure 18:
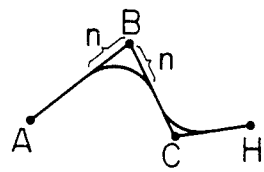
FIG. 18 is a vector diagram to illustrate vectors representative of attitude of the robot's hand.

On the other hand, when the parabolic interpolation is to be effected, the microprocessor 72 reads out the speed information $v_a$ and $v_b$. When neither $v_a$ nor $v_b$ is equal to zero, the arithmetic processor 95 arithmetically determines natural numbers $n_a(=\overline{AB}/v_aT)$ and $n_b(=\overline{BC}/v_bT)$ which satisfy the conditions that $\overline{AB}/v_aT \leq n_a < \overline{AB}/v_aT+1$ and $\overline{BC}/v_bT \leq n_b < \overline{BC}/v_bT+1$, respectively. Concurrently, the value of n is designated and loaded in the RAM 77 through an input/output terminal (not shown) or teaching unit 71. Although the value of n is determined on the basis of the upper limit of acceleration, it is usually determined in dependence on the time required for the robot's hand to move from the point D to E. For example, assuming that the sampling time is 20 ms and the parabolic motion is to be effected during a period of 0.4 sec., then $2n=400/20=20$, whereby the value of n is set to 10. However, in the case where not only the polygon ABC but also the polygon BCH are to be parabolically interpolated as shown in FIG. 18, the set value of n must satisfy the condition that $n/nb \leq \frac{1}{2}$. Accordingly, it is then required that the microprocessor 72 should additionally check whether $2n \leq n_b$ or not.

Subsequently, the microprocessor arithmetically determines the coordinates of the points D and E in FIG. 15 in accordance with $$\overline{DB} = \frac{n}{n_a} \overline{AB}$$

and $$\overline{DE} = \frac{n}{n_b} \overline{BC}$$

on the basis of the designated value of n.

The path extending from the point A to the point D is determined through the equidistant division interpolation in accordance with the prior art method to prepare a program for driving the robot's hand, which program is written in the ROM 94. In case $v_a=0$, it is checked whether or not $\overline{AB}=0$. When $\overline{AB}=0$, the span between the points A and D which is zero because both occupy the same position is interpolated through the equidistant division to prepare a program for the stationary state of the robot's hand, which program is also written in the ROM 94. On the other hand, in the cases where $v_a=0$ and $\overline{AB}\neq 0$ as well as $v_a=0$ and $v_b=0$, an error indication is issued.

Further, in case $v_b=0$, it is checked whether or not $\overline{BC}=0$. If $\overline{BC}=0$, the point E is defined on the point B. On the other hand, when $v_b=0$ and $\overline{BC}\neq 0$, an error indication is issued. Next, the microprocessor 72 takes the coordinates of the point D as those of the point p and takes the coordinates of the point B as those of the point F. Further, the line segment $\overline{FE}$ is divided equally by k where $k=2n$ to determine the point F'. Taking the coordinates of the point F' as those of the point F, the line segment $\overline{PF'}$ is divided equally by $n+1-m/2$ where $n=1$, to determine the point P'. The coordinates of the point p' is outputted as the target coordinates of the target point p and written in the ROM 94.

Simultaneously, it is set that $k=k-1$ and that $m=m+1$. Unless $k=0$, the arithmetic operation described above is repeated until k becomes zero, to thereby determine the target coordinates of the points $p_1$ to E which are then written in the ROM 94.

Figure 15:
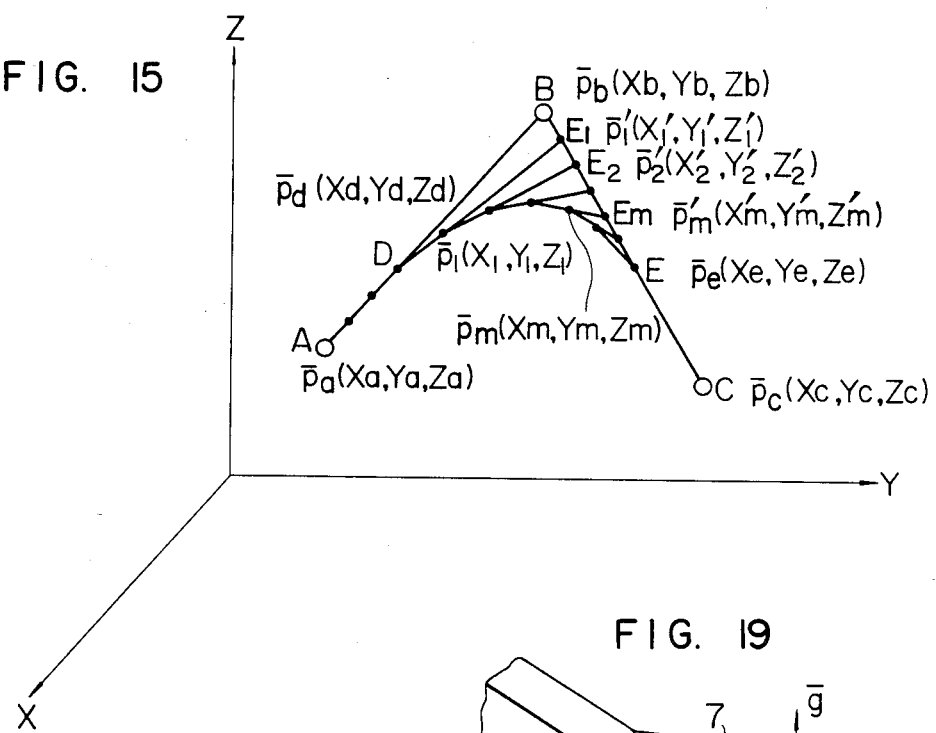
FIG. 15 is a view to illustrate a parabolic interpolation for the motion of the robot's hand in the three-dimensional coordinate system.

Next, it is decided whether or not the linear interpolation is to be effected from the point E to the point C in FIG. 15. When the result of the decision is affirmative (YES), the span between the points E and C is linearly interpolated in the known manner, the results of which are written in the ROM 94. When the decision has proven negative (NO), the procedure returns to the step A of FIG. 16 or alternatively proceeds to another interpolation.

The arithmetic operations for interpolation can be executed by making use of the multiplication/division functions of the arithmetic processor 95.

The positional data of the robot's hand stored in the ROM 94 are read out by the microprocessor and undergo coordinate transformation into contrapositive displacements $\theta_1, \theta_2, \ldots, \theta_6$ which are outputted through the transformed output port 74 and utilized for driving the robot's hand to the desired or target position.

It is obvious that data written in the ROM 94 as described above may be written after the orthogonal coordinate data have been transformed to the coordinate data for the contrapositive displacements from the orthogonal coordinate.

As will be appreciated from the foregoing, the present invention allows the arithmetic operations for interpolating the motion of the robot's hand including acceleration and deceleration thereof to be executed in a much facilitated manner, with the path interpolation for the motion of the robot's hand being realized on a real time base, to great advantages.

Next, description will be made on a method of controlling the attitude of the robot's hand.

Figure 19:
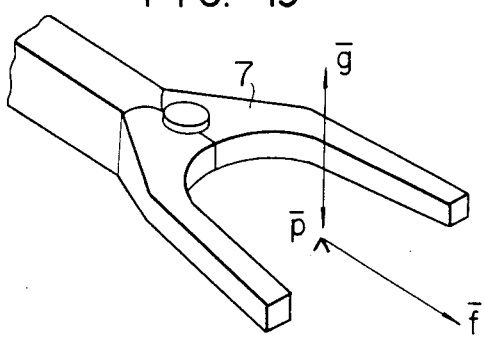
FIG. 19 shows schematically in a perspective view a hand of the robot controlled according to the present invention.

Attitude or orientation of the robot's hand as shown in FIG. 19 is represented by a unit vector $\vec{f}$ coextending with the hand axis and a unit vector $\vec{g}$ perpendicular to the former. The robot is taught as to the position and the attitude through the teaching process. The robot is then so controlled that the hand thereof passes the taught points located between the taught positions, while passing at a uniform time interval every point or position determined through interpolation and located between the taught points.

Figure 20:
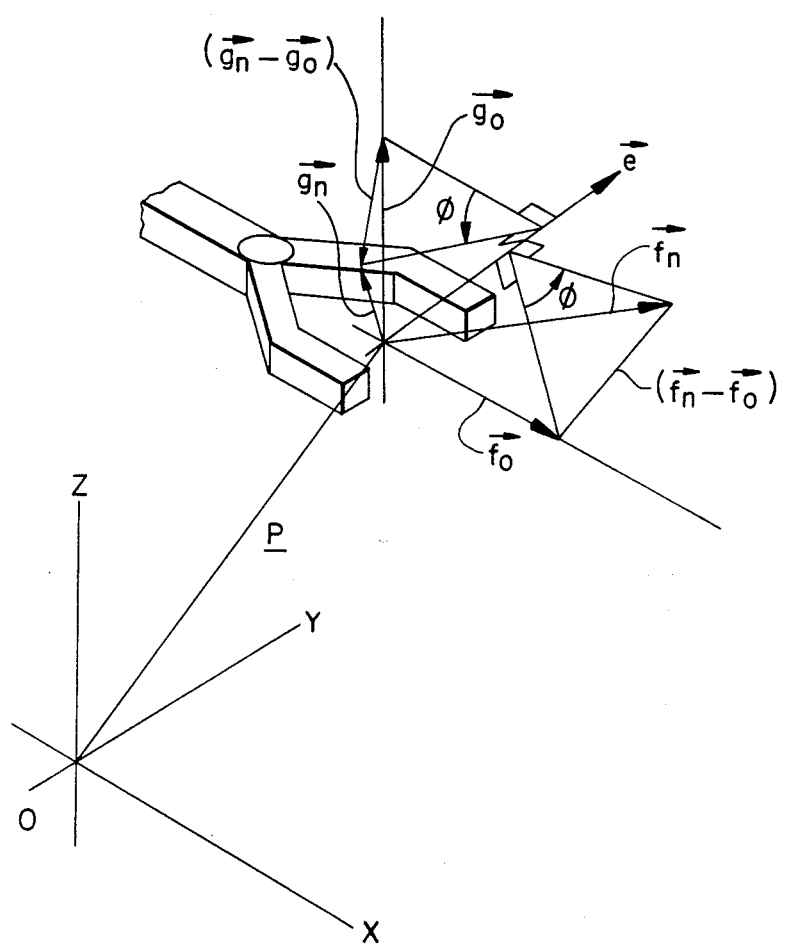
FIG. 20 is a view similar to FIG. 19 and showing two attitudes $(f_o, g_o)$ and $(f_n, g_n)$ of the robot's hand represented as vectors.

Assuming now that two attitudes $(\vec{f_o}, \vec{g_o})$ and $(\vec{f_n}, \vec{g_n})$ are taught, the transition of the robot's hand 7 from the attitude $(\vec{f_o}, \vec{g_o})$ to the other attitude $(\vec{f_n}, \vec{g_n})$ may be defined as a rotation about a vector $\vec{e}$. This described relationship is schematically shown in FIG. 20. Here, $$\left. \begin{array}{l} \vec{e} = 0, \text{ in case } \vec{f_o} = \vec{f_n} \text{ and } \vec{g_o} = \vec{g_n} \\ \vec{e} = \vec{f_o}, \text{ in case } \vec{f_o} = \vec{f_n} \text{ and } \vec{g_o} \neq \vec{g_n} \\ \vec{e} = \vec{g_o}, \text{ in case } \vec{f_o} \neq \vec{f_n} \text{ and } \vec{g_o} = \vec{g_n} \\ e = (\vec{f_o} - \vec{f_n}) \times (\vec{g_n} \times \vec{f_n}); \\ \quad \text{in case } \vec{f_o} - \vec{f_n} \text{ is parallel to } |\vec{g_o} - \vec{g_n}|, \\ \quad \vec{f_o} \neq \vec{f_n}, \text{ and } \vec{g_o} \neq \vec{g_n} \\ = (\vec{f_o} - \vec{f_n}) \times (\vec{g_o} - \vec{g_n}) \end{array} \right\} \quad (16)$$

when a unit vector $\vec{e'}$ which is parallel to the vector $\vec{e}$ is represented by $\vec{e'}$, $$\vec{e'} = \vec{e}/|\vec{e}|$$

The motion of the hand 7 from $(\vec{f_o}, \vec{g_o})$ to $(\vec{f_n}, \vec{g_n})$ corresponds to the rotating movement of the hand 7 about the vector $\vec{e}$ from the attitude $(\vec{f_o}, \vec{g_o})$ by an angle $\phi$, where $\phi$ is given by the following expressions:

$$\cos\phi = \frac{\vec{f_o} \cdot \vec{f_n} - (\vec{e'} \cdot \vec{f_o})^2}{1 - (\vec{e'} \cdot \vec{f_o})^2} \quad (18)$$

$$\sin\phi = \frac{\vec{e'} \cdot (\vec{f_o} \times \vec{f_n})}{(\vec{e'} \times \vec{f_o}) \cdot (\vec{e'} \times \vec{f_o})} \quad (19)$$

Accordingly, when the hand is to be moved from the attitude $(\vec{f_1}, \vec{g_1})$ to $(\vec{f_n}, \vec{g_n})$ during a period $t(=nT)$, the hand is so driven that when the angle is divided equal by n, the attitude of the hand at a time point corresponding to time lapse mT is represented by expressions as follow:

$$\vec{f_n} = \cos\frac{m}{n}\phi\vec{f_o} + \left(1 - \cos\frac{m}{n}\phi\right)(\vec{e'} \cdot \vec{f_o})\vec{e'} + \sin\frac{m}{n}\phi\vec{e'} \times \vec{f_n} \quad (20)$$

$$\vec{g_n} = \cos\frac{n}{m}\phi\vec{g_o} + \left(1 - \cos\frac{m}{n}\phi\right)(\vec{e'} \cdot \vec{g_o})\vec{e'} + \sin\frac{m}{n}\phi\vec{e'} \times \vec{g_o} \quad (21)$$

In this case, the hand takes the attitude $(\vec{f_n}, \vec{g_n})$ after the time lapse of nT.

An exemplary arrangement of a robot system which permits interpolation according to the present invention is shown in FIG. 5. The robot R is taught as to the position and the attitude of its hand by an operator through the teaching unit 71 of a conventional type, whereupon the microprocessor 72 fetches the displacement information of driving shafts of the robot from the associated detectors PE connected to the shafts for arithmetically determining the position and the attitude of the robot. For driving the robot, information or data thus obtained are interpolated through the procedures described hereinbefore, which is followed by arithmetic operations by the processor 72 for determining the rotational displacements of the individual driving shafts on the basis of the data concerning the position and the attitude of the robot's hand.

In the first place, the robot R is driven by means of the teaching box 78, whereby the values of the taught points are fetched by the microprocessor as the displacements of contrapositions by way of the input port 75. Attitude of the robot's hand is then arithmetically determined on the basis of the contrapositive displacements, the results of the arithmetic operation being stored in the RAM 77. From the taught points thus furnished, the rotation axis $\vec{e'}$ and the rotation angle $\phi$ are arithmetically determined with the aid of the arithmetic processor 95 containing therein the tables of trigonometric functions and inverse trigonometric functions as well as multipliers and dividers, for determining the number n of interpolations which accords to the speed designated through the teaching box 78. When the robot is driven, interpolation is made as to the position and the attitude according to the disclosed principle of the present invention, whereby the contrapositive displacements of the robot R are calculated from the values of the hand positions and the attitudes at the sampling points, and outputted to the robot R as the target value.

As will be appreciated from the above description, the present invention makes it possible to realize interpolation for the attitude control with an enhanced accuracy.

It should be mentioned that the concept of the parabolic interpolation described hereinbefore can also be applied to the attitude control. In this connection, reference is again made to FIG. 9 where it is assumed that $n=1$. When the attitude at the point B is represented by $(\vec{f_b}, \vec{g_b})$ with the attitude at the point C being represented by $(\vec{f_c}, \vec{g_c})$, the rotation axis $\vec{e_{bc}}$ for the rotation from $(\vec{f_b}, \vec{g_b})$ to $(\vec{f_c}, \vec{g_c})$ as well as the rotation angle $\phi_{bc}$ can be determined by resorting to the equations (16) to (19). For determining the attitudes at the points $E_m$ where $m=1, 2, 3, \ldots, 6$, the rotation angles $\phi'_m$ of the hand to the points $E_m$ are first determined in accordance with the following equation:

$$\phi'_m = m\phi_{bc}/2n_{bc} \quad (22)$$

The attitudes $(\vec{f'_m}, \vec{g'_m})$ corresponding to the points $E_m$ can be determined by putting the values of $\vec{e_{bn}}$ and $\phi_m$ in place of $\vec{e'}$ and $\phi$ in the equations (20) and (21). In other words, $(\vec{f_m'}, \vec{g_m'})$ represent the attitude of the robot's hand attaind through rotation by $\phi_m$ about the axis $e_{bc}$. Representing the attitudes of the robot's hand corresponding to the points $p_m$ by $(\vec{f_m}, \vec{g_m})$, the rotation axis $e_{m-1}$ and the rotation angle $\phi_m'$ can be determined from $(\vec{f_{m-1}}, \vec{g_{m-1}})$ and $(\vec{f_m}, \vec{g_m})$ in accordance with the equations (16) to (19). Subsequently, calculation of $$\Delta\phi = \phi_{m-1}/n + 1 - \frac{2}{m} \text{ (where } n = 3\text{)}$$

is made, and the attitude $(\vec{f}_m, \vec{g}_m)$ of the robot's hand is determined through rotation by $\Delta\phi$ about the rotation axis $\vec{e_{m-1}}$. The result is written in the ROM 78. In this way, the attitudes at the points $p_1, \ldots, p_m, \ldots, p_e$ are successively parabolically interpolated, and the results of interpolation are stored in the ROM 94. Thus, for controlling the robot's hand, it is sufficient to read out the data $(\vec{f}_m, \vec{g}_m)$ from the ROM 94 as the target or desired attitude data.

As will be appreciated from the foregoing, it is possible according to the invention to realize interpolation for the attitude control of the robot's hand with a high accuracy in a simplified manner.

What is claimed is:

1. A control system for an industrial robot comprising a robot having a hand at an end of the robot; instruction means for providing a polygonal path defined by a plurality of straight lines which interconnect a plurality of point coordinates taught to said robot; arithmetical means for continuously interconnecting said straight lines by a parabola at predetermined locations in the vicinity of the centers of said straight lines, said parabola being generated by dividing a span between two predetermined positions through arithmetic linear interpolation technique in a manner in which points located between said predetermined positions are defined on a straight line interconnecting said two predetermined positions; and driving means for continuously moving said hand of the robot along said parabola generated by said arithemical means from a straight line to the next straight line.

2. A control system for an industrial robot comprising a robot having a hand at an end of the robot; instruction means for providing a path constituted by a plurality of first and second straight lines ($\overline{AB}$, $\overline{BC}$) which interconnect a plurality of point coordinates taught to the robot and providing a speed ($v_a$) on said first straight line ($\overline{AB}$) and a second speed ($v_b$) on said second straight line ($\overline{BC}$); arithmetical means for dividing said second straight line ($\overline{BC}$) arithmetically in dependence on the second speed ($v_b$) corresponding to the speed at which said hand is moved along said second straight line, determining a starting coordinate point (D) by a parabolic interpolation in correspondence with the speed ($v_a$) on said first straight line ($\overline{AB}$), and arithmetically dividing sequentially by a predetermined value the spans between said starting coordinate point (D) and coordinate points ($E_m$) determined by said first arithmetic division for determining parabolic interpolating points ($p_m$); and driving means for continuously moving said hand of the robot along the interpolating points ($p_m$) determined by said arithemetical means from said first to said second straight line.

3. A control system for an industrial robot according to claim 2, wherein said arithmetical means comprises setting means for setting the parabolic interpolation starting point (D) so that a span ($\overline{DB}$) between said starting point and the intermediate nodal point (B) is equal to $n/n_a \cdot v_a \cdot T$, and a parabolic interpolation ending point (E) on the second straight line so that a span ($\overline{BE}$) between said parabolic interpolation ending point (E) and said intermediate nodal point (B) is equal to $n'/n_b \cdot v_b \cdot T$ where $v_a$ represents speed of the hand on said first straight line, $v_b$ represents speed of the hand on said second straight line, T represents a sampling time, $n_a$ represents a natural number selected such that $\overline{AB}/v_a T \leq n_a < \overline{AB}/v_a T + 1$, $n_b$ represents a natural number selected such that $\overline{BC}/v_b T \leq n_b < \overline{BC}/v_b T + 1$, and n and n' represents predetermined natural numbers.

4. A control system for an industrial robot according to claim 3, wherein n is equal to n'.

5. A control system for an industrial robot according to claim 4, wherein coordinate points ($E_m$) on said second straight line determined through arithmetic division divide equally a line segment ($\overline{BE}$) by $2n$, and line segments among said coordinate points ($E_m$) are arithmetically divided by $n+1-m/2$ with said coordinate point (D) serving as the starting point for the parabolic interpolation, to thereby determine the parabolic interpolating points ($p_m$).

6. A control system for an industrial robot according to claim 4 or 5, wherein n is so selected that $\overline{BE} \leq \frac{1}{2}\overline{BC}$, so that the parabolic interpolation can be effected successively.

7. A control system for an industrial robot comprising: a robot having a hand at an end of the robot; instruction means for providing two attitudes ($\vec{f}_o, \vec{g}_o$; $\vec{f}_n, \vec{g}_n$) of the hand taught to the robot in terms of two unit vectors ($\vec{f}, \vec{g}$); arithmetical means for interpolating the the rotation angle of said hand about an axis $(\vec{f}_o - \vec{f}_n) \times (\vec{g}_o - \vec{g}_n)$ for rotating from the attitude ($\vec{f}_o, \vec{g}_o$) to the attitude ($\vec{f}_n, \vec{g}_n$); and driving means for driving said robot's hand to change the attitude thereof in accordance with the rotation angle interpolated by said arithemical means.

8. A control system for an industrial robot according to claim 7, wherein said interpolation is a parabolic interpolation.

9. A method of controlling the movement of a hand of an industrial robot comprising defining a polygonal path for movement of the robot hand by a plurality of straight lines which interconnect a plurality of point coordinates, continuously interconnecting said straight lines by a parabola at predetermined locations in the vicinity of the centers of said straight lines, said parabola being generated by dividing a span between two predetermined positions through arithmetic linear interpolation technique in a manner in which points located between said predetermined positions are defined on a straight line interconnecting said two predetermined positions, and continuously moving said hand of the robot along said generated parabola from a straight line to the next straight line.

10. A method of controlling the movement of a hand of an industrial robot comprising defining a path for movement of the robot hand constituted by a plurality of first and second straight lines ($\overline{AB}$, $\overline{BC}$) which interconnect a plurality of point coordinates, determining parabolic interpolating points ($p_m$) wherein said second straight line ($\overline{BC}$) is arithmetically divided in dependence on a second speed ($v_b$) corresponding to the speed at which said hand is to be moved along said second straight line, and wherein a parabolic interpolation is effected starting from a coordinate point (d) determined in correspondence with a speed ($v_a$) on said first straight line ($\overline{AB}$) to thereby arithmetically divide sequentially by a predetermined value the spans between said starting coordinate point (d) and coordinate points ($E_m$) determined by said first arithmetic division for determining said parabolic interpolating points ($p_m$), and continuously moving said hand along the determined interpolating points ($p_m$) continuously from said first to said second straight line.

11. A method of controlling an industrial robot according to claim 10, wherein said parabolic interpolation starting point (d) on said first straight line is so set that a span ($\overline{DB}$) between said starting point and the intermediate nodal point (B) is equal to $n/n_a \cdot v_a \cdot T$, while a parabolic interpolation ending point (E) is so set on the second straight line so that a span ($\overline{BE}$) between said parabolic interpolation ending point (E) and said intermediate nodal point (B) is equal to $n'/n_b \cdot v_b \cdot T$ where $v_a$ represents speed of the hand on said first straight line, $v_b$ represents speed of the hand on said second straight line, T represents a sampling time, $n_a$ represents a natural number selected such that $\overline{AB}/v_a T < n_a < \overline{AB}/v_a T + 1$, $n_b$ represents a natural number selected such that $\overline{BC}/v_b T \leq n_b < \overline{BC}/v_b T + 1$, and n and n' represent predetermined natural numbers.

12. A method of controlling an industrial robot according to claim 11, wherein n is equal to n'.

13. A method of controlling an industrial robot according to claim 12, wherein coordinate points ($E_m$) on said second straight line determined through arithmetic division divide equally a line segment ($\overline{BE}$) by $2n$, and line segments among said coordinate points ($E_m$) are arithmetically divided by $n + 1 - m/2$ with said coordinate point (D) serving as the starting point for the parabolic interpolation, to thereby determine the parabolic interpolating points ($p_m$).

14. A method of controlling an industrial robot according to claim 12 or 13, wherein n is so selected that $\overline{BE} \leq \frac{1}{2}\overline{BC}$, so that the parabolic interpolation can be effected successively.

15. A method of controlling the attitude of a hand of an industrial robot, comprising teaching attitudes of said hand to said robot in terms of two unit vectors ($\bar{f}, \bar{g}$), and wherein two attitudes ($\bar{f}_o, \bar{g}_o; \bar{f}_n, \bar{g}_n$) are taught, parabolically interpolating the rotation angle for rotating said hand from the attitude ($\bar{f}_o, \bar{g}_o$) to the attitude ($\bar{f}_n, \bar{g}_n$) about an axis ($\bar{f}_o - \bar{f}_n$) $\times$ ($\bar{g}_o - \bar{g}_n$) and rotating said hand through said rotation angle about said axis.

* * * * *